Jan. 15, 1957 N. H. SHEPHERD 2,777,998

ELECTRICAL WAVE FILTER

Filed Sept. 11, 1952

Inventor:
Neal H. Shepherd,
by Merton D. Morse
His Attorney.

United States Patent Office 2,777,998

Patented Jan. 15, 1957

2,777,998

ELECTRICAL WAVE FILTER

Neal H. Shepherd, Syracuse, N. Y., assignor to General Electric Company, a corporation of New York Application September 11, 1952, Serial No. 308,991

4 Claims. (Cl. 333—70)

The present invention relates to electrical wave filters and has an object thereof to provide an improved filter structure in which the elements of the filter structure are arranged in a manner to occupy a minimum of space.

The invention has particular application in radio communication transmitters of the kind used with movable vehicles, in which space is at a premium, to filter out undesired frequencies developed by the output of the transmitter before the output is applied to an antenna.

Another object of the present invention is to provide a filter which is easy to construct and includes a minimum of physical parts, yet is effective and efficient in operation.

Figure 1:
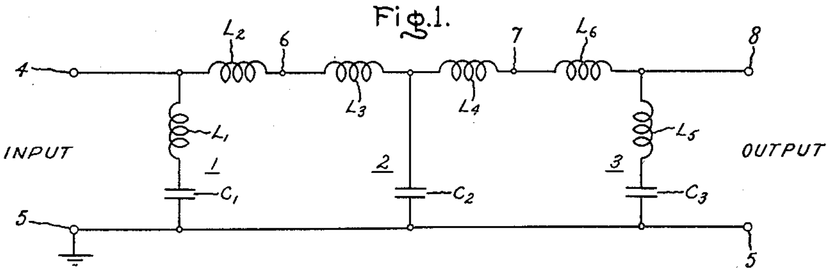
Figure 2:
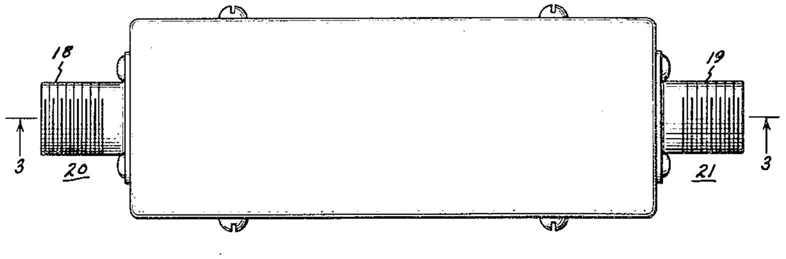
Figure 3:
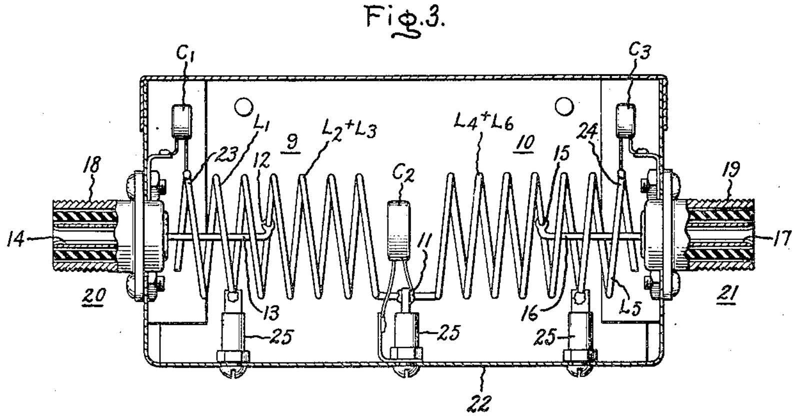

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which Fig. 1 is a schematic diagram of an electrical wave filter; Fig. 2 is a view of the enclosure for the filter including the input and output terminals thereof; and Fig. 3 is a sectional view of the filter structure of the present invention taken along section 3—3 of Fig. 2.

In carrying my invention into effect, a plurality of inductance elements with their axes collinearly arranged are associated with other impedance elements to form a filter. The inductance elements are interconnected with the impedance elements in a manner so that the magnetomotive forces produced by adjacent inductance elements when said filter is in operation are in opposed relationship, thereby minimizing interaction among the inductance elements and permitting the inductance elements to be located close to one another.

Referring now to Fig. 1 of the drawing there is shown a schematic diagram of a filter structure embodying the present invention. This filter comprises three filter sections 1, 2 and 3, each of which has an input terminal, an output terminal and a common input and output terminal. Filter section 1 includes an inductance $L_1$ and a capacitance $C_1$ connected in series between the input terminal 4 and common input and output terminal 5. Section 1 also includes inductance $L_2$ connected between the input terminal 4 and terminal 6. Filter section 2 comprises inductances $L_3$ and $L_4$ connected in series between the input terminal 6 and terminal 7. Filter section 2 also includes capacitor $C_2$ connected between the junction of inductances $L_3$ and $L_4$ and terminal 5. Filter section 3 includes an inductance $L_6$ connected between the terminal 7 and output terminal 8 and also includes inductance $L_5$ and a capacitance $C_3$ connected in series between the output terminal 8 and the common terminal 5 which may be grounded.

The filter of Fig. 1 will pass waves of certain frequencies and will reject passage of waves of other frequencies. These pass and rejection frequencies are determined by the magnitudes and proportioning of the inductive and capacitive elements of the filter as is well known in the art.

In making use of a filter of the character described, the problem often arises of confining the physical structure of such a filter within a limited space as well as constructing the filter in as simple and economical a way as possible.

It is to these problems that the present invention is particularly addressed as will be more apparent by considering Figs. 2 and 3 wherein is shown a physical embodiment of the filter of Fig. 1 in accordance with the present invention.

In Fig. 2 is shown the housing which contains the filter structure. In Fig. 3, which is a section view of Fig. 2 taken along section 3—3, is shown the manner in which the filter structure is formed and arranged to achieve the aforementioned purposes. This filter structure comprises coils 9 and 10 extending from a common point 11 about a common axis in the same transverse direction but in opposite axial directions. Point 12 of coil 9 intermediate the ends thereof is connected by means of conductor 13 extending substantially along the axis of coil 9 to input terminal 14 corresponding to terminal 4 of Fig. 1. Similarly, point 15 of coil 10 intermediate the ends thereof is connected by means of conductor 16 to output terminal 17 corresponding to terminal 8 of Fig. 1. Conductors 18 and 19 of receptacles 20 and 21, respectively, corresponding to terminal 5 of Fig. 1 are insulated from conductors 14 and 17, respectively, and are connected to the metallic housing 22 for the filter. The end 23 of coil 9 remote from common point 11 is connected through capacitor $C_1$ to the housing 22. Similarly the end 24 of coil 10 remote from common point 11 is connected through capacitor $C_3$ to the housing 22. Point 11 is connected to the housing 22 through capacitor $C_2$.

The inductance of coil 9 between points 23 and 12 corresponds to inductance $L_1$ of Fig. 1. The inductance of coil 9 between points 12 and 11 corresponds to sum of inductances $L_2$ and $L_3$ of Fig. 1. The inductance of coil 10 between points 11 and 15 corresponds to sum of inductances $L_4$ and $L_6$ of Fig. 1. The inductance of coil 10 between points 15 and 24 corresponds to inductance $L_5$ of Fig. 1.

In operation, currents flow from input terminal 14 to point 12 and thence from point 12 to points 11 and 23 of coil 9. Since currents flow in opposite directions from point 12 of coil 9 to the ends thereof, the magnetic fluxes developed in these two sections of coil 9 are opposed to each other with the result that intercoupling of these sections is kept at a minimum without the need for spacing these sections apart.

Currents also flow from point 11 to point 15 of coil 10. Since the coil 10 extends about its axis in direction opposite to the direction in which coil 9 extends about its axis which is collinear with the axis of coil 10, the fluxes developed in these parts of coils 9 and 10 oppose each other with the result that intercoupling is kept at a minimum and these coils may be spaced considerably closer than would otherwise be possible.

Currents also flow from point 24 of coil 10 to point 15 and thence to output terminal 17. This current is in a direction opposite to the current flowing from point 11 to point 15 of coil 10. Consequently, the fluxes in these sections of coil 10 oppose each other with the result that intercoupling is kept at a minimum without the need for spacing these sections of this coil apart.

To provide support for the coils 9 and 10 insulating members 25 each having one end thereof fastened to a point on the coils and the other end secured to the housing 22 are located at suitable points along the coils as shown.

Thus a filter structure is provided in which the inductance elements thereof include a pair of identical coils. These coils are oriented in a manner that they may be spaced close together without undesirable interaction between them. Connections are made to these coils in a manner that a plurality of distinct inductance elements closely spaced, yet without undesirable interaction among them, are formed from the coils. These provisions result in a filter structure which includes a minimum of structural parts, and a minimum of connections between parts, yet which is highly effective and efficient in operation, and which occupies a minimum of space.

While I have shown a particular embodiment of my invention, it will of course be understood that I do not wish to be limited thereto since many modifications, both in the circuit arrangement and in the instrumentalities employed, may be made, and I, therefore, contemplate by the appended claims to cover any such modifications as fall within the true spirit and scope of my invention.

What I claim as new and desire to secure by Letters Patent of the United States is:

1. The combination, in a filter, of an input, an output and a common terminal, a pair of inductance coils reversely wound with respect to each other and arranged adjacent to one another with their axes collinear, adjacent ends of said coils being connected together and through a capacitance means to said common terminal, individual impedence means for connecting respective remote ends of said coils to said common terminal, and individual means extending from within said coils for connecting intermediate points of respective ones of said coils to respective ones of said input and output terminals.

2. The combination, in a filter, of an input, an output and a common terminal, a pair of inductance coils reversely wound with respect to each other and arranged adjacent to one another with their axes collinear, adjacent ends of said coils being connected together and through a capacitance means to said common terminal, individual capacitance means for connecting respective remote ends of said coils to said common terminal, and individual means extending from within said coils for connecting intermediate points of each of said coils to respective ones of said input and output terminals.

3. The combination, in a filter, of a pair of input and a pair of output terminals, a pair of inductance coils reversely wound with respect to each other and arranged adjacent to one another with their axes collinear, adjacent ends of said coils being connected together, impedance means for connecting said adjacent ends to one of said input and one of said output terminals, impedance means for connecting the remote end of one of said coils to said one input terminal, impedance means for connecting the remote end of the other of said coils to said one output terminal, individual means extending from within said coils for connecting intermediate points of each of said coils to respective other ones of said input and output terminals.

4. The combination, in a filter, of a pair of inductance coils reversely wound with respect to each other and arranged adjacent to one another with their axes collinear, a metallic enclosure about said coils, adjacent ends of said coils being connected together and through a capacitance means to said enclosure, individual capacitance means for connecting respective remote ends of said coils to said enclosure, an input and an output terminal, individual means extending from within said coils for connecting intermediate points of each of said coils to respective ones of said input and output terminals.

References Cited in the file of this patent

UNITED STATES PATENTS

| | | |
|---|---|---|
| 1,613,952 | Johnson | Jan. 11, 1927 |
| 1,624,682 | Shea | Apr. 12, 1927 |
| 1,852,125 | Miessner | Apr. 5, 1932 |
| 1,866,655 | Lebedinsky | July 12, 1932 |
| 1,881,284 | MacDonald | Oct. 4, 1932 |
| 1,897,249 | Fleming | Feb. 14, 1933 |
| 2,163,775 | Conklin | June 27, 1939 |
| 2,400,857 | Turner | May 21, 1946 |
| 2,419,882 | Bradley | Apr. 29, 1947 |
| 2,641,646 | Thomas | June 9, 1953 |

FOREIGN PATENTS

| | | |
|---|---|---|
| 590,031 | Germany | Dec. 21, 1933 |
| 687,515 | Germany | Jan. 31, 1940 |